United States Patent [19]
Paisley et al.

[11] Patent Number: 5,954,467
[45] Date of Patent: Sep. 21, 1999

[54] METHOD AND APPARATUS FOR ANCHOR BOLT REINFORCEMENT

[75] Inventors: Richard A. Paisley, Lapeer; John T. Bresnahan, Plymouth, both of Mich.

[73] Assignee: Chrysler Corporation, Auburn Hills, Mich.

[21] Appl. No.: 08/691,088

[22] Filed: Aug. 1, 1996

[51] Int. Cl.⁶ .............................. F16B 37/08; F16B 39/12
[52] U.S. Cl. .......................... 411/222; 411/223; 411/237; 411/432; 296/30
[58] Field of Search .................................. 411/237, 222, 411/223, 244, 372, 374, 429, 432, 917, 171; 296/29, 30

[56] References Cited

U.S. PATENT DOCUMENTS

| | | | |
|---|---|---|---|
| 972,140 | 10/1910 | Adam | 411/374 X |
| 1,254,514 | 1/1918 | Lehmann | 411/429 |
| 4,141,573 | 2/1979 | Ellens | 280/744 |
| 4,331,349 | 5/1982 | Funahashi | 280/801 |
| 4,915,414 | 4/1990 | Weman | 280/801 |
| 4,928,992 | 5/1990 | Qvint et al. | 280/801 |
| 4,986,603 | 1/1991 | Hanai et al. | 297/468 |
| 5,096,224 | 3/1992 | Murakami et al. | 280/808 |
| 5,141,352 | 8/1992 | McManus et al. | 403/192 |
| 5,178,412 | 1/1993 | Wier | 280/801 |
| 5,215,332 | 6/1993 | DeSloovere | 280/801 R |
| 5,230,534 | 7/1993 | Boumarafi et al. | 290/801 A |
| 5,333,905 | 8/1994 | Watanabe | 280/801.2 |
| 5,344,188 | 9/1994 | Mims et al. | 280/808 |
| 5,403,070 | 4/1995 | Jahn et al. | 297/468 |
| 5,415,430 | 5/1995 | Valasin | 280/801.1 |
| 5,464,252 | 11/1995 | Kanazawa et al. | 280/805 |

FOREIGN PATENT DOCUMENTS

| | | | |
|---|---|---|---|
| 150548 | 11/1979 | Japan | 411/374 |
| 653437 | 3/1979 | U.S.S.R. | 411/432 |

*Primary Examiner*—Neill Wilson
*Attorney, Agent, or Firm*—William J. Coughlin

[57] ABSTRACT

An apparatus for attaching an item to a floor comprising an anchor bolt, an anchor nut, and an annular collar comprising an upper annular outer ring, a lower annular ring, and an annular side wall connecting the rings, the annular collar held in place over the anchor nut below the floor by a retaining nut.

19 Claims, 1 Drawing Sheet

METHOD AND APPARATUS FOR ANCHOR BOLT REINFORCEMENT

BACKGROUND OF THE INVENTION

1. Field of the Invention

The present invention relates generally to devices for mounting various articles to floors of vehicles, and, more specifically, to a method and apparatus for anchor bolt reinforcement.

2. Description of the Related Art

In automobiles and in other applications, bolts passing through the floors of the vehicle or the other application often are used to mount devices to the floor. Such bolts often are referred to as anchor bolts. It is desirable to increase the strength of the anchor bolt attachment without increasing tooling and manufacturing costs.

SUMMARY OF THE INVENTION

Accordingly, it is an object of the present invention to provide a method and apparatus for anchor bolt reinforcement without increasing tooling and manufacturing cost. Another object of the present invention is to provide a method and apparatus that is easily used and that may be used in a variety of applications.

For that reason, disclosed and claimed herein is an method and apparatus for anchor bolt reinforcement that makes use of an annular collar located beneath the floor and screwed onto the anchor bolt over the anchor nut. The collar comprises an upper annular outer ring, a lower annular ring, and an annular side wall connecting the upper and lower rings.

The details of the present invention, both as to its structure and operation, can best be understood in reference to the accompanying drawings, in which like reference numerals refer to like parts and in which:

DETAILED DESCRIPTION OF THE INVENTION

Figure 1:
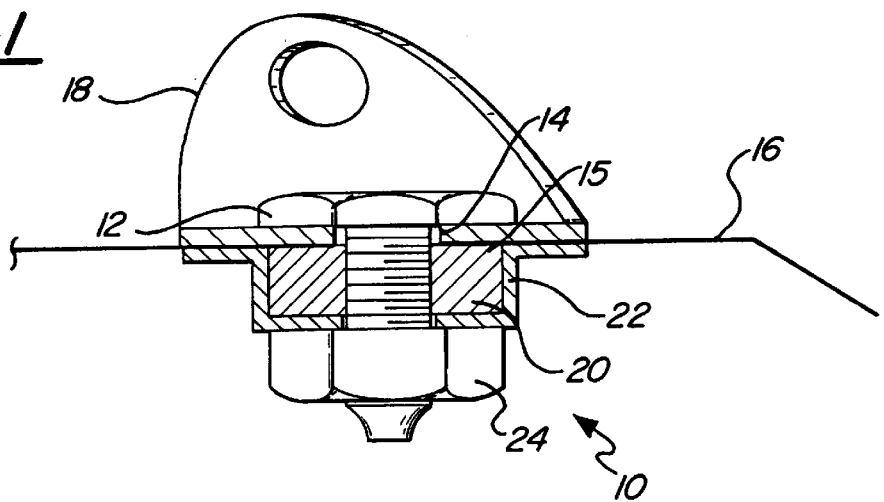
FIG. 1 is a cut-away perspective view of the apparatus of the present invention.
Figure 2:
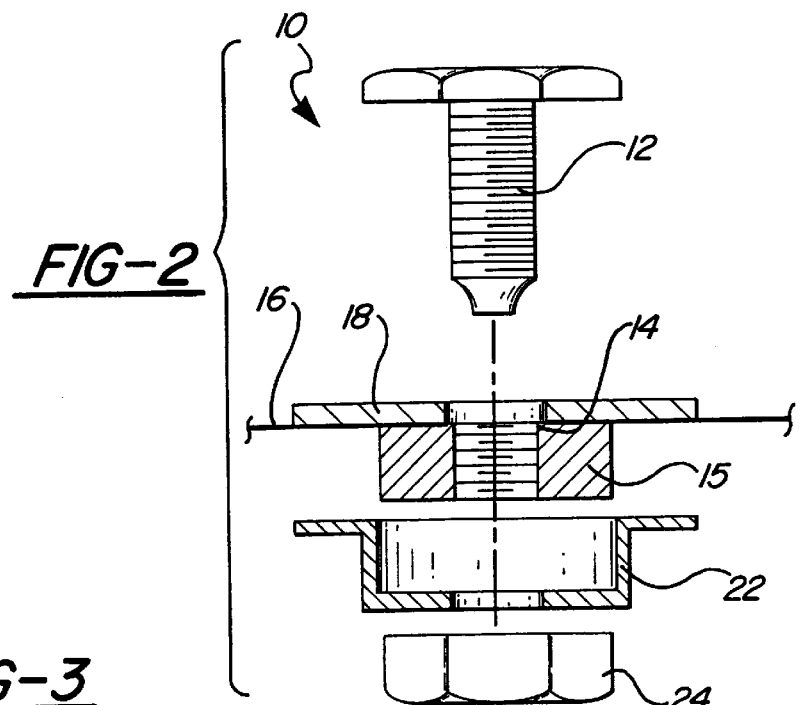
FIG. 2 is a partial cut-away exploded view of the apparatus of the present invention.

Turning first to FIG. 1 and FIG. 2, the apparatus of the present invention can be seen. Anchoring device 10 comprises anchor bolt 12, which passes through hole 14 defined by vehicle floor 16. In the embodiment shown, anchoring device 10 is used to anchor loop 18 to vehicle floor 16, to which a variety of devices may be attached, but its use is not limited to such applications and it may be used wherever a reinforced anchor bolt is desired. Anchoring device 10 further comprises upper nut 15 of which lies below the vehicle floor and which is spot-welded to the vehicle floor. Conventional anchor bolts generally comprise only such a bolt and upper nut. The present invention in contrast further comprises annular collar 22, which is placed over upper nut 15 via bolt hole 30 and against vehicle floor 16. Lower nut 24 is then screwed onto anchor bolt 12 against collar 22, which in turn contacts upper nut 15 and the vehicle floor 16. In this fashion the anchor bolt's attachment to the floor is reinforced.

Figure 3:
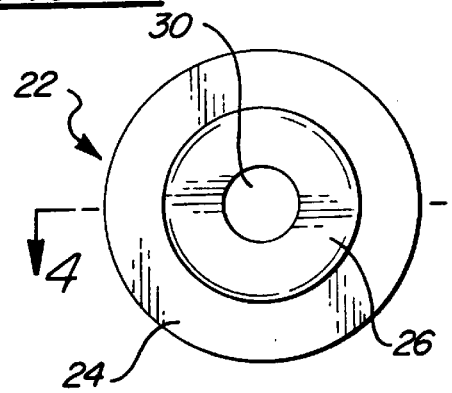
FIG. 3 is a top view of the collar of the apparatus of the present invention.
Figure 4:
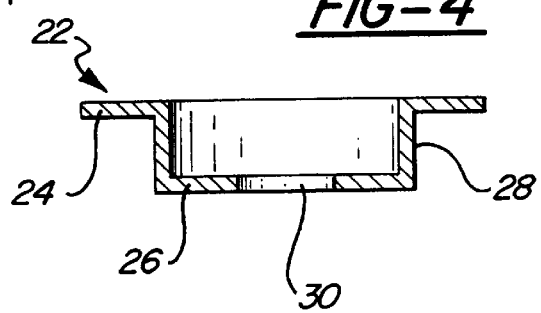
FIG. 4 is a cut-away side view of the collar of the apparatus of the present invention.

Turning to FIG. 3 and FIG. 4, annular collar 22 can be seen in more detail. Collar 22 comprises upper annular ring 24, lower annular ring 26, the rings connected by raised annular wall 28, and bolt hole 30 defined by lower annular ring 26.

The present invention thus provides a method and apparatus for reinforcing anchor bolts that do not require tooling rework.

While particular embodiments of the invention have been described above, the invention is not so limited. Alternative embodiments and modifications which would still be encompassed by the invention may be made by those skilled in the art, particularly in light of the foregoing teachings. Therefor, the following claims are intended to cover any alternative embodiments, modification or equivalents which may be included within the spirit and scope of the invention as claimed.

What is claimed is:

1. An apparatus for attaching an item to a panel comprising:

an anchor bolt having a head adapted to be disposed on a first side of the panel and an externally threaded shaft adapted to extend through an aperture in the panel;

a first nut in threaded engagement with said externally threaded shaft and adapted to be disposed adjacent a second side of the panel;

a reinforcement member defining a cavity for matingly receiving said first nut; and a second nut in threaded engagement with said externally threaded shaft adapted to hold said reinforcement member against the second side of the panel;

wherein said reinforcement member comprises an annular collar having an upper annular flange, a lower annular ring, and an annular side wall connecting said upper annular flange and said lower annular ring.

2. The apparatus of claim 1, wherein said lower annular ring defines an aperture for receiving said externally threaded shaft.

3. The apparatus of claim 2, wherein said second nut is disposed immediately adjacent a lower side of said lower annular ring.

4. The apparatus of claim 2, wherein said upper annular flange is adapted to be disposed parallel to and immediately adjacent the second side of the panel.

5. The apparatus of claim 1, wherein said first nut is adapted to be welded to the second side of the panel.

6. The apparatus of claim 1, wherein said cavity defined by said reinforcement member has dimensions in both an axial direction and a radial direction substantially equal to corresponding dimensions of said first nut.

7. An arrangement for securing an item to a floor of a vehicle, the arrangement comprising:

an anchor bolt having a head disposed on a first side of the floor and an externally threaded shaft extending through an aperture in the floor;

a first nut in threaded engagement with said externally threaded shaft and disposed adjacent a second side of the floor;

a reinforcement member defining a cavity for matingly receiving said first nut; and a second nut in threaded engagement with said externally threaded shaft adapted to hold said reinforcement member against the second side of the floor;

wherein said reinforcement member comprises an annular collar having an upper annular flange, a lower annular ring, and an annular side wall connecting said upper annular flange and said lower annular ring.

8. The arrangement of claim 7, wherein said lower annular ring defines an aperture receiving said externally threaded shaft.

9. The arrangement of claim 7, wherein said second nut is disposed immediately adjacent a lower side of said lower annular ring.

10. The arrangement of claim 7, wherein said upper annular flange is disposed parallel to and immediately adjacent the second side of the floor.

11. The arrangement of claim 7, wherein said first nut is welded to the second side of the floor.

12. The arrangement of claim 7, wherein said cavity defined by said reinforcement member has dimensions in both an axial direction and a radial direction substantially equal to corresponding dimensions of said first nut.

13. A method for attaching an item to a vehicle floor, the method including the steps of:

providing an anchor bolt having a head and a threaded shaft;

securing said anchor bolt to the vehicle floor with a first nut such that said head is disposed on a first side of the vehicle floor and the first nut is threadably engaged with said threaded shaft and immediately adjacent a second side of the vehicle floor; and reinforcing said first nut with a reinforcement member which matingly receives said first nut and abuts the second side of the vehicle floor.

14. The method of claim 13, further comprising the step of securing said reinforcing member to said first nut with a second nut.

15. The method of claim 13, wherein said reinforcement member comprises a collar having an upper annular flange, a lower annular ring, and an annular side wall connecting said upper annular flange and said lower annular ring.

16. An arrangement for attaching an item to a vehicle floor in combination with the vehicle floor, the arrangement comprising:

an anchor bolt having a head and a threaded shaft, said head disposed on a first side of the vehicle floor;

a first nut threadably engaged with said threaded shaft and disposed immediately adjacent a second side of the vehicle floor; and a reinforcement member matingly receiving said first nut and abutting said second side of the vehicle floor.

17. The arrangement of claim 16, further comprising a second nut securing said reinforcing member to said first nut.

18. The arrangement of claim 16, wherein said reinforcement member comprises an annular collar.

19. The arrangement of claim 16, wherein said reinforcement member comprises a collar having an upper annular flange, a lower annular ring, and an annular side wall connecting said upper annular flange and said lower annular ring.

\* \* \* \* \*